United States Patent [19]

Schwarzenbach

[11] 3,943,096
[45] Mar. 9, 1976

[54] USE OF HYDROXYPHENYLURETHANES FOR STABILISING ELASTOMERS

[75] Inventor: Kurt Schwarzenbach, Pfeffingen, Switzerland

[73] Assignee: Ciba-Geigy Corporation, Ardsley, N.Y.

[22] Filed: Apr. 3, 1975

[21] Appl. No.: 564,935

[30] Foreign Application Priority Data

Apr. 9, 1974    Switzerland.......................... 4992/74

[52] U.S. Cl........ 260/45.85 A; 260/808; 260/471 C
[51] Int. Cl.²............................................. C08J 3/20
[58] Field of Search...................... 260/45.85 A, 808

[56] References Cited
UNITED STATES PATENTS

| | | | |
|---|---|---|---|
| 2,135,641 | 11/1938 | Jacobson .................... | 260/45.85 A |
| 3,081,335 | 3/1963 | Morris et al. ................ | 260/45.85 A |
| 3,303,211 | 2/1967 | Peterson et al. ............. | 260/45.85 A |
| 3,318,842 | 5/1967 | Blachere et al............... | 260/45.85 A |
| 3,511,804 | 5/1970 | Duennenberger et al. ... | 260/45.85 A |
| 3,657,314 | 4/1972 | Kliener ........................ | 260/45.85 A |
| 3,850,878 | 11/1974 | Murtha et al. ............... | 260/45.85 A |
| 3,865,761 | 2/1975 | Schnabel...................... | 260/45.85 A |

*Primary Examiner*—V. P. Hoke
*Attorney, Agent, or Firm*—Charles W. Vanecek

[57] ABSTRACT

The use of compounds of the formula I

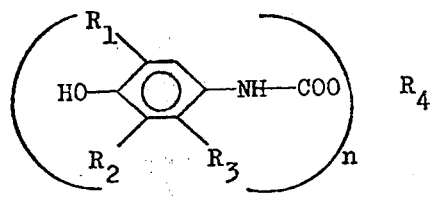

wherein $R_1$ denotes alkyl with 3 or 4 carbon atoms, $R_2$ denotes alkyl with 1 – 4 carbon atoms, $R_3$ denotes hydrogen or methyl, n denotes 1 or 2 and $R_4$, if n is 1, denotes alkyl with 8 – 14 carbon atoms, cycloalkyl with 5 or 6 carbon atoms, benzyl, phenyl, phenyl substituted by 1 to 2 alkyl groups and/or alkoxy groups each with 1 – 8 carbon atoms, phenylthioalkyl with 8–9 carbon atoms or a radical of the formula $$-(CH_2)_m-X-R \qquad (Ia)$$

Wherein X is oxygen or sulphur, R is alkyl with 1 – 4 carbon atoms and m is 2 or 3, or, if n is 2, denotes alkylene with 2 – 8 carbon atoms, phenylene or a radical of the formula $$-(CH_2)_m-X-(CH_2)_q- \qquad (Ib)$$

wherein X is oxygen or sulphur and m and q independently of one another are 2 or 3, for stabilising elastomers.

11 Claims, No Drawings

USE OF HYDROXYPHENYLURETHANES FOR STABILISING ELASTOMERS

It is known from U.S. Pat. Specification No. 3,297,726 to employ hydroxyphenylurethanes of stearyl alcohol as stabilisers for natural or synthetic rubbers. Furthermore it is known, from Japanese Pat. Publication No. 20,456/69, to use hydroxyphenylurethanes of lower alcohols, such as ethyl alcohol, as stabilisers for polyolefines or polyurethanes. It has now been found, surprisingly, that compounds of the formula I

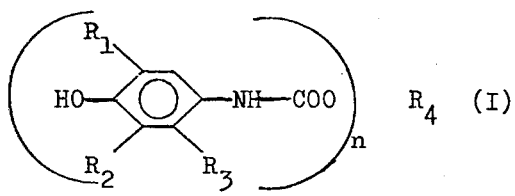

wherein $R_1$ denotes alkyl with 3 or 4 carbon atoms, $R_2$ denotes alkyl with 1–4 carbon atoms, $R_3$ denotes hydrogen or methyl, n denotes 1 or 2 and $R_4$, if $n$ is 1, denotes alkyl with 8–14 carbon atoms, cycloalkyl with 5 or 6 carbon atoms, benzyl, phenyl, phenyl substituted by 1 to 2 alkyl groups and/or alkoxy groups each with 1–8 carbon atoms, phenylthioalkyl with 8 to 9 carbon atoms or a radical of the formula $$-(CH_2)_m-X-R \qquad (Ia)$$

wherein X is oxygen or sulphur, R is alkyl with 1–4 carbon atoms and m is 2 or 3, or, if n is 2, denotes alkylene with 2–8 carbon atoms, phenylene or a radical of the formula $$-(CH_2)_m-X-(CH_2)_q- \qquad (Ib)$$

wherein X is oxygen or sulphur and $m$ and $q$ independently of one another are 2 or 3, are better stabilisers for elastomers than are the previously known hydroxyphenylurethanes.

In the definition of the compounds of the formula I, $R_1$, $R_2$ and/or the substituents of the phenyl radical $R_4$ can be alkyl groups. Within the stated limits they can be, for example, methyl, ethyl, iso-propyl, butyl, sec.-butyl, tert.-butyl, amyl, tert.-amyl, sec.-amyl, hexyl, octyl or tert.-octyl.

$R_4$ can be, for example, an alkyl group with 8–14 carbon atoms, such as octyl, tert.-octyl, decyl, dodecyl or tetradecyl, or a cycloalkyl group with 5 or 6 carbon atoms, such as cyclopentyl or cyclohexyl.

If the phenyl radical in $R_4$ is substituted by alkoxy groups with 1–8 carbon atoms, these substituents are preferably in the o— or p-position. They can be methoxy, ethoxy, butoxy, hexoxy or octoxy.

If $R_4$ denotes a radical of the formula Ia, it can be, for example, 3-oxabutyl or 3-thiabutyl.

If $R_4$, in the definition of the formula I, is alkylene with 2 to 8 carbon atoms, it can be, for example, ethylene, propylene, trimethylene, tetramethylene, hexamethylene or octamethylene.

A radical of the formula Ib as $R_4$ is, for example, $$-CH_2CH_2-O-CH_2-CH_2- \quad \text{or}$$
$$-CH_2CH_2-S-CH_2CH_2-.$$

According to the invention, compounds of the formula I in which $R_1$ and $R_2$ denote tert.-butyl, $R_3$ denotes hydrogen, n denotes 1 or 2 and $R_4$, if n is 1, denotes alkyl with 8–14 carbon atoms, benzyl, phenyl, phenyl substituted by 1 or 2 alkyl groups each with 1–4 carbon atoms, or a radical of the formula $$-(CH_2)_m-O-R$$

wherein R is alkyl with 1–4 carbon atoms and m is 2 or 3, or, if n is 2, denotes alkylene with 6 carbon atoms, are preferably used.

The use of the compounds of the formula I, in which $R_1$ and $R_2$ denote tert.-butyl, $R_3$ denotes hydrogen, n denotes 1 or 2 and $R_4$, if n is 1, denotes alkyl with 8–12 carbon atoms, 3-oxabutyl, benzyl, phenyl, or phenyl substituted by 1 or 2 alkyl groups with 1–4 carbon atoms, or, if n is 2, denotes alkylene with 6 carbon atoms, is particularly preferred.

Examples of compounds of the formula I are N-(3,5-ditert.butyl-4-hydroxyphenyl)-carbamic acid cyclohexyl ester, bis-[N-(3,5-ditert.butyl-3-hydroxyphenyl)-carbamic acid]-p-phenylene ester, 1,5-bis-[N-(3,5-ditert.butyl-4-hydroxyphenyl)-carbamyl]-3-oxapentane, N-(3,5-ditert.butyl-4-hydroxyphenyl)-carbamic acid 4,4-dimethyl-3-thiapentyl ester, N-(3,5-ditert.butyl-4-hydroxyphenyl)-carbamic acid 4,4,6,6-tetramethyl-3-thiaheptyl ester, N-(3,5-ditert.butyl-4-hydroxyphenyl)-carbamic acid phenylthiopropyl ester and 1,5-bis-[N-(3,5-ditert.butyl-4-hydroxyphenyl)-carbamyl]-3-thiapentane.

Some of the compounds of the formula I are known. They can be prepared, for example, by reaction of a corresponding p-aminophenol with a chlorocarbonic acid ester. A further possible method of preparation is to react a substituted p-hydroxyphenylisocyanate with an alcohol.

The compounds of the formula I are used as stabilisers for elastomers such as, for example, natural rubber, polybutadiene, ethylene-propylene copolymers, propylene-butene-1 copolymers, propylene-isobutylene copolymers, styrene-butadiene copolymers, and terpolymers of ethylene and propylene with a diene such as, for example, hexadiene, dicyclopentadiene or ethylidenenorbornene, as well as styrene polymers which have been modified by incorporation of rubber phases to make them impact-resistant, such as acrylonitrile/butadiene/styrene, acrylonitrile/styrene or acrylic ester copolymers.

The compounds of the formula I are incorporated into the substrates in a concentration of 0.005 to 5 percent by weight, calculated relative to the material to be stabilised.

Preferably, 0.01 to 1.0, in particular preferentially 0.02 to 0.5, percent by weight of the compounds, calculated relative to the material to be stabilised, is incorporated into the latter. They can be incorporated, for example, by admixing at least one of the compounds of the formula I, and, if appropriate, further additives, in accordance with the methods customary in the art, before or during moulding, or by applying the dissolved or dispersed compounds to the polymer, if appropriate with subsequent evaporation of the solvent.

The compounds of the formula I can also be added before or during the polymerisation, in which case, through possible incorporation into the polymer chain, stabilised substrates can be obtained in which the stabilisers are neither volatile nor extractable.

The following may be mentioned as examples of further additives with which the stabilisers can be conjointly employed:

1. ANTIOXIDANTS 1.1. Simple 2,6-dialkylphenols, such as, for example, 2,6-ditert.-butyl-4-methylphenol, 2-tert.-butyl-4,6-dimethylphenol, 2,6-di-tert.-butyl-4-methoxymethylphenol and 2,6-dioctadecyl-4-methylphenol.

1.2. Derivatives of alkylated hydroquinones, such as, for example, 2,5-di-tert.-butyl-hydroquinone, 2,5-di-tert.-amylhydroquinone, 2,6-di-tert.-butyl-hydroquinone, 2,5-di-tert.-butyl-4-hydroxy-anisole, 3,5-di-tert.-butyl-4-hydroxyanisole, tris-(3,5-di-tert.-butyl-4-hydroxyphenyl)-phosphite, 3,5-di-tert.-butyl-4-hydroxyphenyl-stearate and bis-(3,5-di-tert.-butyl-4-hydroxyphenyl)-adipate.

1.3. Hydroxylated thiodiphenyl ethers, such as, for example, 2,2′-thio-bis-(6-tert.-butyl-4-methylphenol), 2,2′-thio-bis-(4-octylphenol), 4,4′-thio-bis-(6-tert.-butyl-3-methylphenol), 4,4′-thio-bis-(3,6-di-sec.-amylphenol), 4,4′-thio-bis-(6-tert.-butyl-2-methylphenol) and 4,4′-bis-(2,6-dimethyl-4-hydroxyphenyl)-disulphide.

1.4. Alkylidene-bisphenols, such as, for example, 2,2′-methylene-bis-(6-tert.-butyl-4-methylphenol), 2,2′-methylene-bis-(6-tert.-butyl-4-ethylphenol), 4,4′-methylene-bis-(6-tert.butyl-2-methylphenol), 4,4′-methylene-bis-(2,6-di-tert.-butylphenol), 2,6-di-(3-tert.butyl-5-methyl-2-hydroxybenzyl)-4-methylphenol, 2,2′-methylene-bis-[4-methyl-6-(α-methylcyclohexyl)-phenol], 1,1-bis-(3,5-dimethyl-2-hydroxyphenyl)-butane, 1,1-bis-(5-tert.butyl-4-hydroxy-2-methylphenyl)-butane, 2,2-bis-(3,5-di-tert.butyl-4-hydroxyphenyl)-propane, 1,1,3-tris-(5-tert.butyl-4-hydroxy-2-methylphenyl)-butane, 2,2-bis-(5-tert.butyl-4-hydroxy-2-methylphenyl)-4-n-dodecylmercapto-butane, 1,1,5,5-tetra-(5-tert.butyl-4-hydroxy-2-methylphenyl)-pentane and ethylene glycol bis-[3,3-bis-(3′-tert.butyl-4′-hydroxyphenyl)-butyrate].

1.5. O-, N- and S-benzyl compounds, such as, for example, 3,5,3′,5′-tetra-tert.butyl-4,4′-dihydroxydibenzyl ether, 4-hydroxy-3,5-dimethylbenzyl-mercaptoacetic acid octadecyl ester, tris-(3,5-di-tert.butyl-4-hydroxybenzyl)-amine and bis-(4-tert.butyl-3-hydroxy-2,6-dimethylbenzyl)-dithioterephthalate.

1.6. Hydroxybenzylated malonic esters, such as, for example, 2,2-bis-(3,5-di-tert.butyl-2-hydroxybenzyl)-malonic acid dioctadecyl ester, 2-(3-tert.butyl-4-hydroxy-5-methyl-benzyl)-malonic acid dioctadecyl ester, 2,2-bis-(3,5-di-tert.butyl-4-hydroxybenzyl)-malonic acid didodecylmercaptoethyl ester and 2,2-bis-(3,5-di-tert.butyl-4-hydroxybenzyl)-malonic acid di-[4-(1,1,3,3-tetramethylbutyl)-phenyl] ester.

1.7. Hydroxybenzyl-aromatics, such as, for example, 1,3,5-tri-(3,5-di-tert.butyl-4-hydroxybenzyl)-2,4,6-trimethylbenzene, 1,4-di-(3,5-di-tert.butyl-4-hydroxybenzyl)-2,3,5,6-tetramethylbenzene and 2,4,6-tri-(3,5-di-tert.butyl-4-hydroxybenzyl)-phenol.

1.8. s-Triazine compounds, such as, for example, 2,4-bis-octylmercapto-6-(3,5-di-tert.butyl-4-hydroxyanilino)-s-triazine, 2-octylmercapto-4,6-bis-(3,5-di-tert.butyl-4-hydroxyanilino)-s-triazine, 2-octylmercapto-4,6-bis-(3,5-di-tert.butyl-4-hydroxy-phenoxy)-s-triazine, 2,4,6-tris-(3,5-di-tert.butyl-4-hydroxy-phenoxy)-s-triazine, 2,4,6-tris-(3,5-di-tert.butyl-4-hydroxyphenylethyl)-s-triazine and 1,3,5-tris(3,5-di-tert.butyl-4-hydroxybenzyl)-isocyanurate.

1.9. Amides of β-(3,5-di-tert.butyl-4-hydroxyphenyl)-propionic acid, such as, for example, 1,3,5-tris-(3,5-di-tert.butyl-4-hydroxyphenyl-propionyl)-hexahydro-s-triazine and N,N′-di-(3,5-di-tert.butyl-4-hydroxyphenyl-propionyl)-hexamethylenediamine.

1.10. Esters of β-(3,5-di-tert.butyl-4-hydroxyphenyl)-propionic acid with monohydric or polyhydric alcohols, such as, for example, with methanol, ethanol, octadecanol, 1,6-hexanediol, 1,9-nonanediol, ethylene glycol, 1,2-propanediol, diethylene glycol, thiodiethylene glycol, neopentyl glycol, pentaerythritol, 3-thiaundecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo[2,2,2]-octane.

1.11. Esters of β-(5-tert.butyl-4-hydroxy-3-methylphenyl)-propionic acid with monohydric or polyhydric alcohols, such as, for example, with methanol, ethanol, octadecanol, 1,6-hexanediol, 1,9-nonanediol, ethylene glycol, 1,2-propanediol, diethylene glycol, thiodiethylene glycol, neopentyl glycol, pentaerythritol, 3-thiaundecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo-[2,2,2]-octane.

1.12. Esters of 3,5-di-tert.butyl-4-hydroxyphenylacetic acid with monohydric or polyhydric alcohols, such as, for example, with methanol, ethanol, octadecanol, 1,6-hexanediol, 1,9-nonanediol, ethylene glycol, 1,2-propanediol, diethylene glycol, thio-diethylene glycol, neopentyl glycol, pentaerythritol, 3-thiaundecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo-[2,2,2]-octane.

1.13. Benzylphosphonates, such as, for example, 3,5-di-tert.butyl-4-hydroxybenzyl-phosphonic acid dimethyl ester, 3,5-di-tert.butyl-4-hydroxybenzyl-phosphonic acid diethyl ester, 3,5-di-tert.butyl-4-hydroxybenzyl-phosphonic acid dioctadecyl ester and 5-tert.butyl-4-hydroxy-3-methylbenzyl-phosphonic acid dioctadecyl ester.

1.14. Aminoaryl derivatives, such as, for example, phenyl-1-naphthylamine, phenyl-2-naphthylamine, N,N′-diphenyl-p-phenylenediamine, N,N′-di-2-naphthyl-p-phenylenediamine, N,N′-di-sec.butyl-p-phenylenediamine, 6-ethoxy-2,2,4-trimethyl-1,2-dihydroquinoline, 6-dodecyl-2,2,4-trimethyl-1,2-dihydroquinoline, monooctyliminodibenzyl and dioctyliminodibenzyl and polymerised 2,2,4-trimethyl-1,2-dihydroquinoline. Octylated diphenylamine, nonylated diphenylamine, N-phenyl-N′-cyclohexyl-p-phenylenediamine, N-phenyl-N′-isopropyl-p-phenylenediamine, N,N′-di-sec.octyl-p-phenylenediamine, N-phenyl-N′-sec.octyl-p-phenylenediamine, N,N′-di-(1,4-dimethylpentyl)-p-phenylenediamine, N,N′-dimethyl-N,N′-di-(sec.octyl)-p-phenylenediamine, 2,6-dimethyl-4-methoxyaniline, 4-ethoxy-N-sec.-butylaniline, the condensation product of diphenylamine and acetone, and phenothiazine.

2. UV ABSORBERS AND LIGHT STABILISERS 2.1. 2-(2′-Hydroxyphenyl)-benztriazoles, such as, for example, the 5′-methyl-, 3′,5′-di-tert.butyl-, 5′-tert.butyl-, 5′-(1,1,3,3-tetramethylbutyl)-, 5-chloro-3′,5′-di-tert.butyl-, 5-chloro-3′-tert.butyl-5′-methyl-, 3′-sec.butyl-5′-tert.butyl-, 3′-α-methylbenzyl-5′-methyl-, 3′-α-methylbenzyl-5′-methyl-5-chloro-, 4′-hydroxy-, 4′- methoxy-, 4'-octoxy-, 3',5'-di-tert.amyl-, 3'-methyl-5'-carbomethoxyethyl- and 5-chloro-3',5'-di-tert.-amyl-derivative.

2.2. 2,4-Bis-(2'-hydroxyphenyl)-6-alkyl-s-triazines, such as, for example, 6-ethyl-, 6-heptadecyl or 6-undecyl-derivative.

2.3. 2-Hydroxybenzophenones, such as, for example, the 4-hydroxy-, 4-methoxy-, 4-octoxy-, 4-decyloxy-, 4-dodecyloxy-, 4-benzyloxy, 4,2',4'-trihydroxy- or 2'-hydroxy-4,4'-dimethoxy-derivative.

2.4. 1,3-Bis-(2'-hydroxybenzoyl)-benzenes, such as, for example, 1,3-bis-(2'-hydroxy-4'-hexyloxy-benzoyl)-benzene, 1,3-bis-(2'-hydroxy-4'-octyloxy-benzoyl)-benzene and 1,3-bis-(2'-hydroxy-4'-dodecyloxy-benzoyl)-benzene.

2.5. Esters of optionally substituted benzoic acids, such as, for example, phenyl salicylate, octylphenyl salicylate, dibenzoylresorcinol, bis-(4-tert.-butylbenzoyl)-resorcinol, benzoylresorcinol and 3,5-di-tert.-butyl-4-hydroxybenzoic acid 2,4-di-tert.butyl-phenyl ester, octadecyl ester or 2-methyl-4,6-di-tert.butyl-phenyl ester.

2.6. Acrylates, such as, for example, α-cyano-β,β-diphenylacrylic acid ethyl ester or isooctyl ester, α-carbomethoxycinnamic acid methyl ester, α-cyano-β-methyl-p-methoxycinnamic acid methyl ester or butyl ester and N-(β-carbomethoxyvinyl)-2-methyl-indoline.

2.7. Nickel compounds, such as, for example, nickel complexes of 2,2'-thio-bis-[4-(1,1,3,3-tetramethyl-butyl)-phenol], such as the 1:1 or 1:2 complex, optionally with additional ligands such as n-butylamine, triethanolamine or N-cyclohexyl-di-ethanolamine, nickel complexes of bis-[2-hydroxy-4-(1,1,3,3-tetramethyl-butyl)-phenyl]-sulphone, such as the 2:1 complex, optionally with additional ligands such as 2-ethyl-caproic acid, nickel dibutyldithiocarbamate, nickel salts of 4-hydroxy-3,5-di-tert.butylbenzyl-phosphonic acid monoalkyl esters, such as of the methyl, ethyl or butyl ester, nickel complexes of ketoximes such as of 2-hydroxy-4-methyl-phenyl-undecylketonoxime, nickel 3,5-di-tert.butyl- 4-hydroxybenzoate and nickel isopropylxanthate.

2.8. Sterically hindered amines, such as, for example, 4-benzoyloxy-2,2,6,6-tetramethylpiperidine, 4-stearoyloxy-2,2,6,6-tetramethylpiperidine, bis-(2,2,6,6-tetramethylpiperidyl)-sebacate and 3-n-octyl-7,7,9,9-tetramethyl-1,3,8-triaza-spiro[4,5]decane-2,4-dione.

2.9 Oxalic acid diamides, such as, for example, 4,4'-dioctyloxy-oxanilide, 2,2'-dioctyloxy-5,5'-di-tert.butyl-oxanilide, 2,2'-didodecyloxy-5,5'-di-tert.butyl-oxanilide, 2-ethoxy-2'-ethyl-oxanilide, N,N'-bis-(3-dimethylaminopropyl)-oxalamide, 2-ethoxy-5-tert.butyl-2'-ethyl-oxanilide and its mixture with 2-ethoxy-2'-ethyl-5,4'-di-tert.butyl-oxanilide and mixtures of ortho- and para-methoxy- as well as of o- and p-ethoxy-disubstituted oxanilides.

3. Metal deactivators, such as, for example, oxanilide, isophthalic acid dihydrazide, sebacic acid bis-phenylhydrazide, bis-benzylidene-oxalic acid dihydrazide, N,N'-diacetyl-adipic acid dihydrazide, N,N'-bis-salicyloyl-oxalic acid dihydrazide, N,N'-bis-salicyloyl-hydrazine, N,N'-bis-(3,5-di-tert.butyl-4-hydroxyphenylpropionyl)-hydrazine, N-salicylal-N'-salicylidenehydrazine and 3-salicyloylamino-1,2,4-triazole.

4. Phosphites, such as, for example, triphenyl phosphite, diphenylalkyl phosphites, phenyldialkyl phosphites, trinonylphenyl phosphite, trilauryl phosphite, trioctadecyl phosphite, 3,9-di-isodecyloxy-2,4,8,10-tetroxa-3,9-diphosphaspiro[5,5]undecane and tri-(4-hydroxy-3,5-di-tert.butyl-phenyl) phosphite.

5. Compounds which destroy peroxide, such as, for example, esters of β-thiodipropionic acid, for example the lauryl, stearyl, myristyl or tridecyl esters, mercapto-benzimidazole and the zinc salt of 2-mercapto-benzimidazole. 6. Nucleating agents, such as, for example, 4-tert.butyl-benzoic acid, adipic acid and diphenylacetic acid. 7. Other additives, such as, for example, plasticisers, lubricants, emulsifiers, fillers, carbon black, asbestos, kaolin, talc, glass fibres, pigments, optical brighteners, flameproofing agents and antistatic agents.

The preparation and use of the compounds which can be employed according to the invention is described in greater detail in the examples which follow. In these, parts denote parts by weight and percentages denote percentages by weight.

EXAMPLE 1

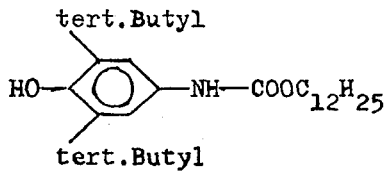

22.1 g (0.1 mol) of 2,6-ditert.butyl-4-aminophenol and 10.1 g (0.1 mol) of triethylamine are together dissolved in 200 ml of dimethylacetamide. 27.3 g (0.11 mol) of chlorocarbonic acid dodecyl ester are added to the resulting dark green solution over the course of 15 minutes at room temperature. After the exothermic reaction has subsided, the mixture is stirred for a further 30 minutes at 60°C and is then poured onto approx. 1 litre of ice water. The product which precipitates as an oil is extracted with ether. After drying and evaporation, a red oil remains, which is caused to crystallise by trituration with ice-cold hexane. This gives N-(3,5-ditert.butyl-4-hydroxyphenyl)-carbamic acid dodecyl ester (stabiliser No. 1) of melting point 50°C.

If, in this example, the chlorocarbonic acid dodecyl ester is replaced by equivalent amounts of chlorocarbonic acid esters shown in Table 1 below, the corresponding N-(3,5ditert.butyl-4-hydroxyphenyl)-carbamic acid esters, having the melting points indicated, are obtained.

Table 1

| Chlorocarbonic acid ester | Melting point of the reaction product (°C) | Stabiliser No. |
| --- | --- | --- |
| $C_2H_5OCOCl$ | 120° | 2 |
| $C_{18}H_{37}OCOCl$ | 72° | 3 |
| $CH_3OCH_2CH_2OCOCl$ | 135° | 4 |
| $C_8H_{17}OCOCl$ | 91° | 5 |

Table 1-continued

| Chlorocarbonic acid ester | Melting point of the reaction product (°C) | Stabiliser No. |
| --- | --- | --- |
| 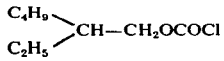 C₄H₉\<br>C₂H₅/CH—CH₂OCOCl | liquid | 6 |
| 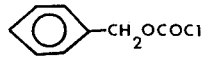 ⌬—CH₂OCOCl | 90° | 7 |
| 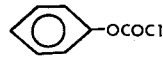 ⌬—OCOCl | 198° | 8 |
| 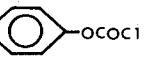 tert. Butyl—⌬—OCOCl | 166° | 9 |
|  tert. Butyl—⌬(tert. Butyl)—OCOCl | 137° | 10 |
| ClCOO—(CH₂)₆—OCOCl | 153° | 11 |

EXAMPLE 2

Stabilisation of polybutadiene rubber a. Preparation of the test specimens 100 parts of polybutadiene ("Solprene 201" of Messrs. Phillips), which is prestabilised with 0.75 percent of 2,6-ditert.-butyl-p-cresol and 0.5 percent of tris-nonylphenyl phosphite, are additionally homogenised with 0.125 part of one of the stabilisers indicated in Table 2 in a Brabender plastograph for 10 minutes at 150°C and 60 rpm. The mixtures stabilised in this way are pressed for 5 minutes in a platen press at 120°C to give 0.625 mm thick sheets. The unstabilised rubber sheet which serves for comparison is prepared in the same way.

b. Test

The criterion used for the protective action of the stabilisers which have been incorporated is the gel content ascertained after storage in air at elevated temperatures. For this purpose, the test specimens obtained above are kept on an aluminium base in a circulating air oven at 100°C and are examined periodically (approx. every 10 hours) for their gel content, which is determined as follows:

About 1 g of the samples are cut into pieces of size about 3×3×1 mm and are dissolved overnight in 100 ml of n-hexane at room temperature. These solutions are filtered through glass wool, the gel particles retained by the glass wool are rinsed with 3×20 ml of n-hexane and the filtered solutions are evaporated by dryness and dried to constant weight. The gel content of a sample is then obtained in accordance with the following calculation:

$$\text{gel content in \%} = \frac{E - A}{E} \cdot 100$$

Here, E denotes the total weight of the sample examined and A denotes the weight of the dissolved portion of the sample examined.

The end point is defined as the time after which there is a sudden rise in the gel content to above 15%, after an induction period which is characteristic of the additive investigated. (Table 2).

Table 2

| Stabiliser No. | Induction period up to the rapid formation of 15% gel content |
| --- | --- |
| without stabiliser | 5 hours |
| 1 | 216 hours |
| 5 | 237 hours |
| 11 | 196 hours |
| 2 | 105 hours |
| 3 | 158 hours |

Example 2 shows the surprisingly greater activity of the stabilisers used according to the invention as compared to the stabilisers known from Japanese Pat. Publication No. 20,456/69 (stabiliser 2) and from U.S. Pat. No. 3,297,726 (stabiliser 3), representing the state of the art.

EXAMPLE 3

The test specimens described in Example 2 are in addition tested for their colour stability after the ageing times indicated in Table 3, the measure of yellowing used being the "Gardner" scale, in which zero denotes colourlessness and the figures 1–18 denote progressively greater yellowing.

Table 3

| Stabiliser No. | Gardner colour index, after .. hours | | | | | | |
| --- | --- | --- | --- | --- | --- | --- | --- |
| | 0 | 40 | 80 | 120 | 160 | 200 | 240 |
| without stabiliser | 0 | 9 | 10 | 10 | 11 | 12 | 15 |
| 1 | 0 | 1 | 1 | 2 | 2 | 3 | 4 |
| 5 | 0 | 1 | 1 | 2 | 2 | 3 | 4 |
| 11 | 0 | 1 | 1 | 2 | 3 | 4 | 8 |

What is claimed is:

1. Stabilised elastomer containing compounds of the formula I

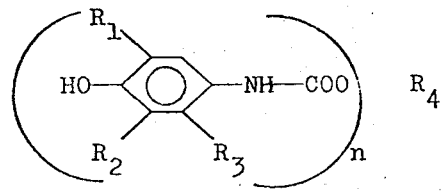

wherein R₁ denotes alkyl with 3 or 4 carbon atoms, R₂ denotes alkyl with 1 – 4 carbon atoms, R₃ denotes hydrogen or methyl, n denotes 1 or 2 and R₄, if n is 1, denotes alkyl with 8 – 14 carbon atoms, cycloalkyl with 5 or 6 carbon atoms, benzyl, phenyl, phenyl substituted by 1 to 2 alkyl groups and/or alkoxy groups each with 1 – 8 carbon atoms, phenylthioalkyl with 8 – 9 carbon atoms, a radical of the formula

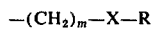    (Ia)

wherein X is oxygen or sulphur, R is alkyl with 1 – 4 carbon atoms and m is 2 or 3, or, if n is 2, denotes alkylene with 2 – 8 carbon atoms, phenylene or a radical of the formula

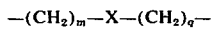    (Ib)

wherein X is oxygen or sulphur and m and q independently of one another are 2 or 3.

2. Stabilised elastomer according to claim 1, characterised in that in the formula I R₁ and R₂ denote tert.butyl, R₃ denotes hydrogen, n denotes 1 or 2 and R₄, if n is 1, denotes alkyl with 8 – 14 carbon atoms, benzyl, phenyl, phenyl substituted by 1 or 2 alkyl groups each with 1 – 4 carbon atoms, or a radical of the formula

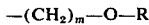

wherein R is alkyl with 1 – 4 carbon atoms and m is 2 or 3, or, if n is 2, denotes alkylene with 6 carbon atoms.

3. Stabilised elastomer according to claim 1, characterised in that in the formula I R₁ and R₂ denote tert.butyl, R₃ denotes hydrogen, n denotes 1 or 2 and R₄, if n is 1, denotes alkyl with 8 – 12 carbon atoms, 3-oxabutyl, benzyl, phenyl, or phenyl substituted by 1 or 2 alkyl groups with 1 – 4 carbon atoms or, if n is 2, denotes alkylene with 6 carbon atoms.

4. Stabilised elastomer according to claim 1, characterised in that the elastomer is a polyolefine.

5. Stabilised elastomer according to claim 1, characterised in that the elastomer is polybutadiene.

6. Stabilised elastomer according to claim 1, containing a compound

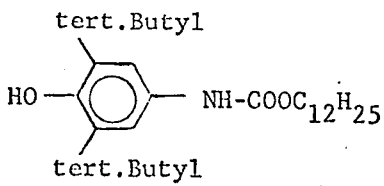

7. Stabilised elastomer according to claim 1, containing a compound

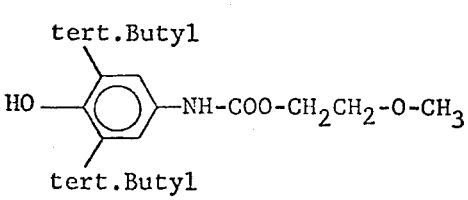

8. Stabilised elastomer according to claim 1, containing

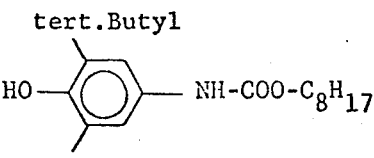

9. Stabilised elastomer according to claim 1, containing a compound

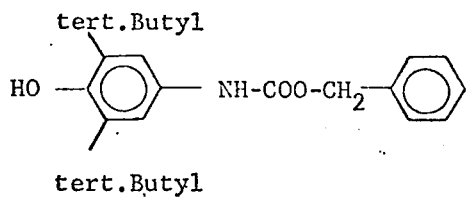

10. Stabilised elastomer according to claim 1, containing a compound

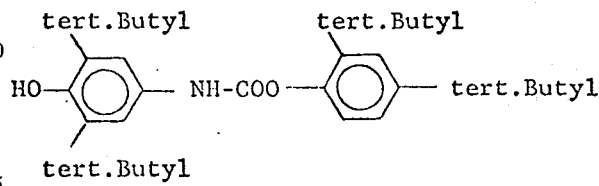

11. Process for stabilising elastomers, characterised in that compounds of the formula I

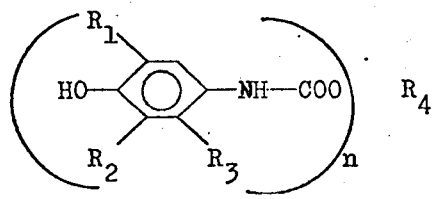

wherein R₁ denotes alkyl with 3 or 4 carbon atoms, R₂ denotes alkyl with 1 – 4 carbon atoms, R₃ denotes hydrogen or methyl, n denotes 1 or 2 and R₄, if n is 1, denotes alkyl with 8 – 14 carbon atoms, cycloalkyl with 5 or 6 carbon atoms, benzyl, phenyl, phenyl substituted by 1 to 2 alkyl groups and/or alkoxy groups each with 1 – 8 carbon atoms, phenylthioalkyl with 8 – 9 carbon atoms, a radical of the formula

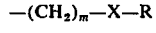    (Ia)

wherein X is oxygen or sulphur, R is alkyl with 1 – 4 carbon atoms and m is 2 or 3, or, if n is 2, denotes alkylene with 2 – 8 carbon atoms, phenylene or a radical of the formula

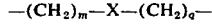    (Ib)

wherein X is oxygen or sulphur and m and q independently of one another are 2 or 3, are incorporated.

* * * * *